C. H. HOLWAY.
LIQUID LEVEL INDICATOR.
APPLICATION FILED FEB. 4, 1915.
1,207,919.
Patented Dec. 12, 1916.
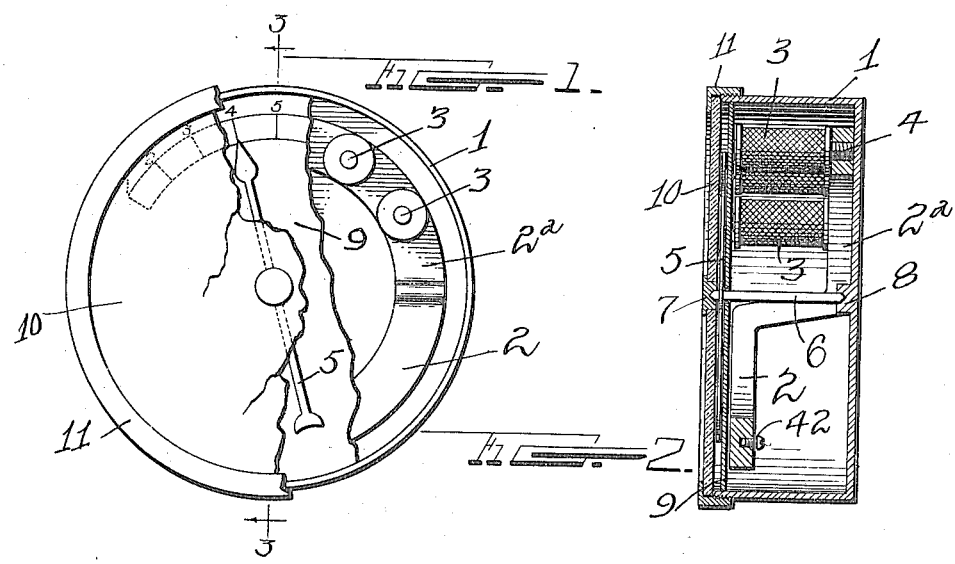

UNITED STATES PATENT OFFICE.

CHARLES H. HOLWAY, OF LA CROSSE, WISCONSIN.

LIQUID-LEVEL INDICATOR.

1,207,919.     Specification of Letters Patent.     Patented Dec. 12, 1916.

Application filed February 4, 1915. Serial No. 6,178.

*To all whom it may concern:*

Be it known that I, CHARLES H. HOLWAY, a citizen of the United States, residing at La Crosse, in the county of La Crosse and State of Wisconsin, have invented certain new and useful Improvements in Liquid-Level Indicators, of which the following is a specification.

This invention relates to indicators, and particularly to that general class of indicators used in connection with fuel reservoirs of motor vehicles.

The primary object of the invention is to provide a device of this character which may be used for synchronously indicating, at a distance point, the status of the liquid in a reservoir, such for instance as an indicating device provided on the dash of a vehicle and adapted to be controlled by the status of the liquid in the fuel reservoir; or the invention may also be applicable for use in indicating the amount of lubricating oil present in a supply reservoir or in the crank case of an engine.

A further object of the invention is to provide a simple and inexpensive device for realizing the results above stated, and particularly one which may be relied upon for accuracy at all times.

With these and minor objects in view, the invention may be more readily understood upon reference to the illustrative embodiment shown in the accompanying drawings, and to certain novel details of construction and combination of parts to be hereinafter more particularly pointed out in the subjoined claims.

In said drawings: Figure 1 is a front elevation of the indicator with parts broken away. Fig. 2 is a sectional view on the line 3—3 of Fig. 2.

1 represents the cylindrical case of the indicator, in which is mounted a multipolar field magnet comprising the circular sheet iron ring 2, offset at $2^a$ for the purpose of mounting the magnets 3—3 perpendicular to the said iron ring. These magnets are so wound, with their turns of wire proceeding in the same direction, that each produces the same polarity on the ends of their cores which are rigidly mounted in and form magnetic connection with the said iron ring 2. This connection is shown at 4 in Fig. 3. A permanently magnetized balanced steel armature 5 is rigidly mounted on the shaft 6 which in turn is pivotally mounted in the bearings 7 and 8. The longitudinal center of this shaft 6 is in the geometric center of the field magnet ring 2. Between the surface of this field magnet ring 2, and the plane of rotation of the armature 5, is suitably mounted the index card 9. The glass cover 10 bears against the case 1 and is held in place by the flanged ring 11. The bearing 7 is mounted in this glass cover as shown. By this construction it will now be seen that when one of the magnets is energized, the pointer will at once assume a position directly over it, and when two adjacent magnets are energized, the pointer will assume a position in the center of the magnetic field, or in other words, midway between the magnets. Any suitable means may be employed for closing the various circuits of the multipolar field magnet in accordance with the rise and fall of the fluid.

I claim:

1. An indicator, comprising a multipolar magnet constructed of an iron ring having an offset portion in which its poles are mounted, an indicator armature pivoted in the geometric center of said multipolar magnet and having a path of travel which brings its pointer end successively under control of the respective poles of said magnet, its lower end being continuously under control of the lower portion of said magnet, and independent circuits for the respective poles of said magnet.

2. An indicator, a magnet having a plurality of poles and windings, adapted to be energized successively, a ring piece, poles being mounted on one side of a diameter of said ring piece, and an indicator armature of magnetic material pivoted concentric with said ring and having one end passing successively under the influence of the several poles, and the other end continuously under the influence of the other side of the ring.

The foregoing specification signed at La Crosse, Wis., this 21st day of January, 1915.

CHARLES H. HOLWAY.

In presence of—
    FRANK WOLFE,
    O. J. SWENNES.

Copies of this patent may be obtained for five cents each, by addressing the "Commissioner of Patents, Washington, D. C."